US007263827B2

(12) United States Patent
Oshima et al.

(10) Patent No.: US 7,263,827 B2
(45) Date of Patent: Sep. 4, 2007

(54) EXHAUST PIPE INSULATOR ATTACHING STRUCTURE FOR SADDLE-RIDING VEHICLE

(75) Inventors: Tadashi Oshima, Saitama (JP); Masao Takeshima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 10/815,773

(22) Filed: Apr. 2, 2004

(65) Prior Publication Data

US 2004/0216453 A1 Nov. 4, 2004

(30) Foreign Application Priority Data

Apr. 4, 2003 (JP) ............................ 2003-102126
Apr. 4, 2003 (JP) ............................ 2003-102130

(51) Int. Cl.
*F01N 7/00* (2006.01)
*F16L 3/00* (2006.01)

(52) U.S. Cl. ........................................ 60/322; 248/62

(58) Field of Classification Search .................. 60/272, 60/322, 320; 180/219, 309; 280/219, 291; 55/385.3; 248/62

See application file for complete search history.

(56) References Cited

U.S. PATENT DOCUMENTS 3,237,716 A * 3/1966 Parsons ...................... 181/243
3,863,445 A * 2/1975 Heath .......................... 60/299
4,085,816 A * 4/1978 Amagai et al. ............ 180/89.2
4,955,193 A * 9/1990 Hoeptner, III ............... 60/320
5,036,947 A * 8/1991 Metzger ..................... 181/241
5,603,297 A * 2/1997 Wolf et al. ............. 123/195 C
6,287,354 B1 * 9/2001 Nozaki ...................... 55/385.3
6,408,980 B1 * 6/2002 Dooley ....................... 181/228
6,438,949 B1 * 8/2002 Nozaki ........................ 60/322
6,464,761 B1 * 10/2002 Bugli .......................... 96/135
6,530,443 B1 * 3/2003 Tsuruta et al. ............. 180/89.2
6,537,338 B2 * 3/2003 Inoue et al. ............... 55/385.3
6,715,581 B2 * 4/2004 Dooley ....................... 181/228
2002/0069625 A1 * 6/2002 Stass ......................... 55/385.3

(Continued)

FOREIGN PATENT DOCUMENTS

JP 2001-123829 A 5/2001

(Continued)

*Primary Examiner*—Thomas Denion
*Assistant Examiner*—Loren Edwards
(74) *Attorney, Agent, or Firm*—Birch, Stewart, Kolasch & Birch, LLP

(57) ABSTRACT

An air cleaner and an exhaust pipe insulator attaching structure for a vehicle engine. The air cleaner on a rear side of the engine includes an air cleaner element disposed in an upper portion inside an air cleaner case. An air cleaner intake-air duct is inserted into the air cleaner case obliquely from above, and then is curved inside the air cleaner case and extended up to directly underneath the air cleaner element. An exhaust duct provided at a front side of the engine is provided with an arc-shaped heat insulator structure. An attachment member includes a curved arc-shaped contact portion and attachment portions formed on an outward side of the arc-shaped contact portion in a radial direction. An inner-peripheral face of the arc-shaped contact portion of the attachment member is brought into contact with an outer-peripheral face of the exhaust duct, and held in place by a band member.

22 Claims, 8 Drawing Sheets

U.S. PATENT DOCUMENTS

| | | | | |
|---|---|---|---|---|
| 2002/0185323 | A1* | 12/2002 | Tsutsumi et al. | 180/219 |
| 2003/0226412 | A1* | 12/2003 | Rumminger et al. | 73/866.5 |
| 2004/0045756 | A1* | 3/2004 | Martin | 180/219 |
| 2004/0083714 | A1* | 5/2004 | Tsuruta | 60/272 |

FOREIGN PATENT DOCUMENTS

| | | |
|---|---|---|
| JP | 2001-280204 A | 10/2001 |

* cited by examiner

EXHAUST PIPE INSULATOR ATTACHING STRUCTURE FOR SADDLE-RIDING VEHICLE

CROSS-REFERENCE TO RELATED APPLICATION

The present application claims priority under 35 U.S.C. § 119 to Japanese Patent Application No. 2003-102130 and Patent Application No. 2003-102126, both of which were filed on Apr. 4, 2003, the entire contents of which are hereby incorporated by reference.

BACKGROUND OF THE INVENTION

1. Field of the Invention

The present invention relates to an air cleaner and exhaust pipe insulator attaching structure for a saddle-riding vehicle and, more particularly, to improvement in the appearance thereof.

2. Description of Background Art

Concerning air cleaners for saddle-riding vehicles, there is one in which an air cleaner element is disposed in an upper portion inside an air cleaner case, and an air cleaner intake-air duct is inserted into the air cleaner case linearly and obliquely from above and is opened toward a corner portion between a bottom wall portion and a side wall portion inside the air cleaner case (for example, Japanese Unexamined Patent Publication No. 2001-280204)

In the air cleaner described above, since the air cleaner intake-air duct is inserted into the air cleaner case linearly and obliquely from above, the length of the air cleaner intake-air duct cannot be made long. As a result, there has been a problem that the air-intake efficiency to bring out optimum engine characteristics cannot be obtained in a saddle-riding vehicle in which importance is placed especially on low-to-middle speed torque.

In addition, among saddle-riding vehicles and the like, there are some which have an exhaust pipe exposed outside, in which case a heat insulator is attached, as needed, to such exposed part of the exhaust pipe. As a technique relating to such a heat insulator attaching structure for a vehicle exhaust pipe, there is one in which an arc-shaped step portion protruding to an inner-peripheral face side is provided on a heat insulator curved into an arc shape; an inner-peripheral face of this arc-shaped step portion on the heat insulator is brought into contact with an exhaust pipe of a vehicle engine; a band member is put around outer-peripheral faces of the arc-shaped step portion and of the exhaust pipe; and an attachment member is fastened to the exhaust pipe with the band member (for example, Japanese Unexamined Patent Publication No. 2001-123829)

In the structure disclosed in Japanese Unexamined Patent Publication No. 2001-123829, arc-shaped step portions are provided on a heat insulator, and band members are put around outer-peripheral faces of these arc-shaped step portions and of an exhaust pipe. Accordingly, the step portions on the heat insulator and the band members put around these step portions are exposed outside, and therefore there has been a problem that this structure does not provide a good appearance. Moreover, since the step portions on the heat insulator are in direct contact with the exhaust pipe, there also has been a problem that these step portions are affected by heat, which easily generates rust and the like on a front face side of the step portions.

SUMMARY AND OBJECTS OF THE INVENTION

Therefore, objects of the present invention include providing an air cleaner for a saddle-riding vehicle in which the length of an air cleaner intake-air duct can be made long and the air-intake efficiency to bring out optimum engine characteristics can be obtained, and also providing a heat insulator attaching structure for a vehicle exhaust pipe which can improve the appearance and reduce the influence of heat on a heat insulator.

In order to achieve the objects mentioned above, a first aspect of the present invention provides an air cleaner element which is disposed in an upper portion inside an air cleaner case and which has an air cleaner intake-air duct inserted into the air cleaner case obliquely from above, curved inside the air cleaner case and extended up to directly underneath the air cleaner element.

Since, as described above, the air cleaner intake-air duct is inserted into the air cleaner case obliquely from above, and then curved inside the air cleaner case and extended up to directly underneath the air cleaner element, it is possible to make the length of the air cleaner intake-air duct long.

According to a second aspect of the present invention, the entire of an opening portion of the air cleaner intake-air duct inside the air cleaner case is opposed to a side wall face of the air cleaner case.

Since, as described above, the entire opening portion of the air cleaner intake-air duct is opposed to the side wall face of the air cleaner case, the air introduced into the air cleaner case from the opening portion of the air cleaner intake-air duct will be discharged toward the side wall face of the air cleaner case and accordingly will not easily raise water, mud and the like accumulated in a bottom wall portion of the air cleaner case.

According to a third aspect of the present invention a drain port is provided in a bottom wall portion of the air cleaner case, at a position upstream of the opening portion in the direction of an air flow at the opening portion of the air cleaner intake-air duct inside the air cleaner case.

Since, as described above, the drain port is provided at the position upstream of the opening portion in the direction of an air flow at the opening portion of the air cleaner intake-air duct, it is possible to allow the water, mud and the like to favorably flow toward the drain port by use of a steady back air flow from the air cleaner case without the influence of the turbulence of air discharged from the opening portion of the air cleaner intake-air duct when the air hits the air cleaner case.

According to a fourth aspect of the present invention a structure is provided in which a heat insulator with a cross-section orthogonal to an extending direction thereof being curved substantially into an arc shaped, is attached to an exhaust pipe of a vehicle engine so as to allow distance therebetween, characterized in that an attachment member including a curved arc-shaped contact and the attachment portion formed on an outward side of the arc-shaped contact portion in its radius direction so as to allow distance therebetween, is attached to an inner-peripheral face of the heat insulator through the attachment portion; an inner-peripheral face of the arc-shaped contact portion of the attachment member is brought into contact with an outer-peripheral face of the exhaust pipe; a band member is put around an outer-peripheral face of the arc-shaped contact portion and the outer-peripheral face of the exhaust pipe; and the attachment member is fastened to the exhaust pipe with the band member.

In this way, the attachment portion of the attachment member is attached to the inner-peripheral face of the heat insulator curved into an arc shape, the inner-peripheral face of the arc-shaped contact portion formed so as to allow distance from this attachment portion of the attachment member is brought into contact with the outer-peripheral face of the exhaust pipe, the band member is put around the outer-peripheral faces of the arc-shaped contact portion and of the exhaust pipe, and the attachment member is fastened to the exhaust pipe with this band member. Accordingly, since the heat insulator is attached to the exhaust pipe through the attachment member attached to the inner-peripheral face, that is, the exhaust pipe side of the heat insulator and through the band member put around this attachment member, the attachment member and the band member are covered with the heat insulator. Moreover, the heat insulator is attached to the exhaust pipe through the attachment member, thus allowing distance therebetween. Accordingly, since the heat insulator does not come into direct contact with the exhaust pipe, the heat of the exhaust pipe becomes difficult to be transmitted to the heat insulator.

According to a fifth aspect of the present invention, blocking edge portions rising on the outer-peripheral face side from curved both-end edge portions of the arc-shaped contact portion, are formed in the attachment member.

Since the blocking edge portions rising on the outer-peripheral face side are formed at the curved both-end edge portions of the arc-shaped contact portion as described above, the rigidity of the attachment member can be ensured. Moreover, guided by the blocking edge portions on both sides, the band member is attached to the outer-peripheral face of the arc-shaped contact portion and, at the same time, prevented from falling off the arc-shaped contact portion by the blocking edge portions on both sides.

According to a sixth aspect of the present invention, the attachment portions are formed in the attachment member, each on the opposite side of each of the blocking edge portions to the arc-shaped contact portion.

By forming the attachment portions on the opposite sides of each blocking edge portion relative to the arc-shaped contact portion as described above, the blocking edge portion can be shared by portions where the attachment portions are formed so as to allow distance from the arc-shaped contact portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a perspective view showing a saddle-riding vehicle to which a heat insulator attaching structure for a vehicle exhaust pipe according to an embodiment of the present invention is applied, where a power unit and an exhaust pipe are illustrated in a state of sight through;

DETAILED DESCRIPTION OF THE PREFERRED EMBODIMENTS

A description will be given below of an air cleaner for a saddle-riding vehicle according to an embodiment of the present invention with reference to the drawings. Note that the words “front, rear, left, right” in the following description indicate “front, rear, left, right” directions relative to the traveling direction of a vehicle when it moves forward.

Figure 1:
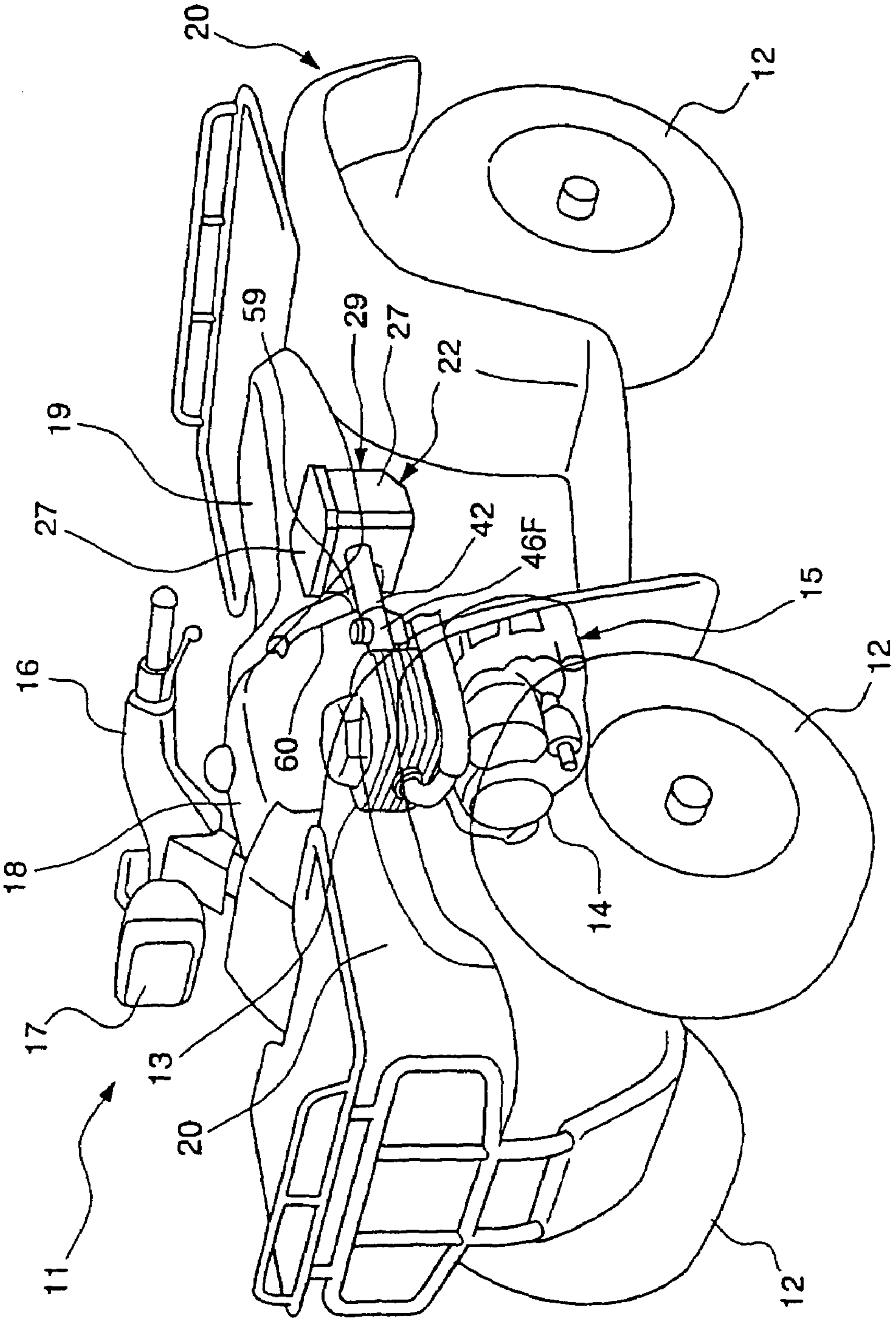
FIG. 1 is a perspective view showing a saddle-riding vehicle to which an embodiment of the present invention is applied.

FIG. 1 is a perspective view showing a saddle-riding vehicle (so-called buggy) which is intended mainly for driving over rough terrain.

This saddle-riding vehicle 11 includes wheels 12 arranged at four right-front, left-front, right-rear, and left-rear corners of a body; a power unit 15 including an engine 13 mounted at a substantially central position of the body and a transmission 14; a handlebar 16 which is installed on an upper front portion of the body so as to extend in the left and right direction and to which an input to control the front wheels is provided; a head light unit 17 supported by the handlebar 16; a fuel tank 18 installed in the rear of the handlebar 16; a seat 19 installed in the rear of the fuel tank 18; and a body cover 20 made of resin. Note that this saddle-riding vehicle 11 is assumed to be of a so-called longitudinal layout type in which a crankshaft (not shown) of the engine 13 is provided so as to extend in the front and rear direction.

An air cleaner 22 according to this embodiment which takes air in and supplies the air to the engine 13 after removing dust, dirt and the like therefrom, is disposed under the seat 19 of this saddle-riding vehicle 11.

Figure 2:
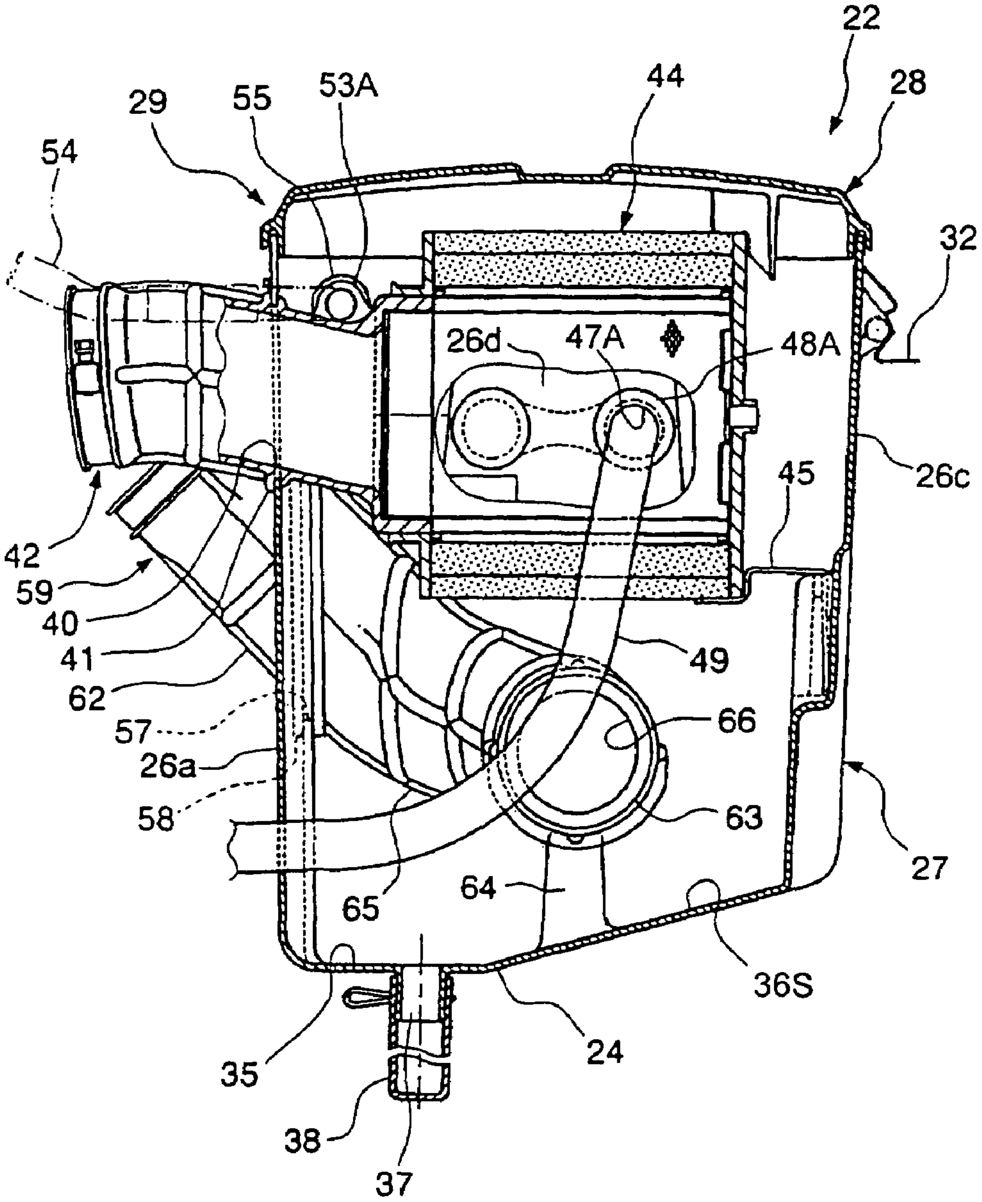
FIG. 2 is a sectional side view showing an air cleaner for a saddle-riding vehicle according to the embodiment of the present invention.
Figure 3:
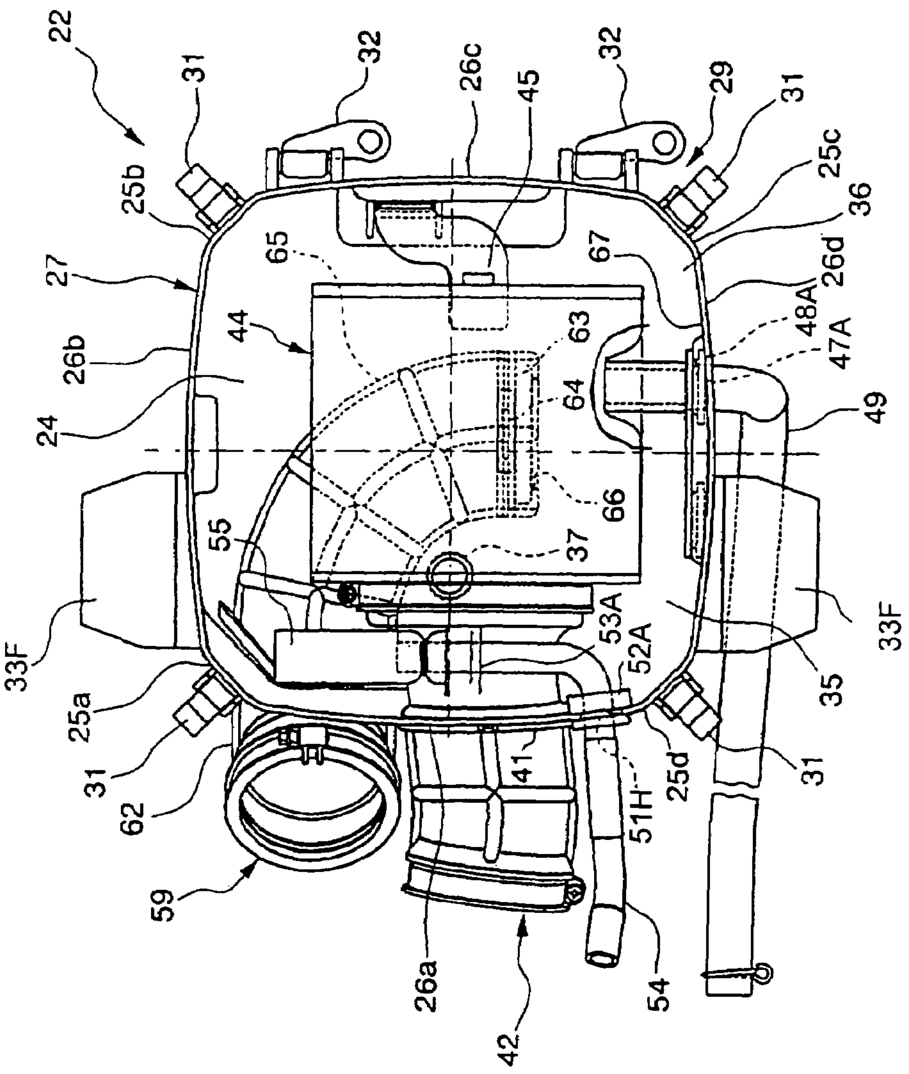
FIG. 3 is a plan view in a state where a lid is removed, showing the air cleaner for a saddle-riding vehicle according to the embodiment of the present invention.

The air cleaner 22 according to this embodiment will be described with reference mainly to FIGS. 2 and 3. Note that the left-hand side of each of FIGS. 2 and 3 corresponds to the vehicle front side, i.e., the engine 13 side.

The air cleaner 22 includes an air cleaner case 29 in a box form. The air cleaner case 29 includes a case main body 27 in a tubular shape with a closed bottom end and an opened top, having a bottom wall portion 24 which has a shape, as seen in plan view, obtained by chamfering each corner of a quadrangle and extends substantially along a horizontal plane, four corner wall portions 25*a* to 25*d* which are arranged so as to stand upwards from the chamfered positions of the bottom wall portion 24, and four side wall portions 26*a* to 26*d* which extend along the up and down direction and each interconnect adjacent ones of the corner wall portions 25*a* to 25*d*; and a lid 28 which closes the opened top by being placed over the top of the case main body 27.

A lid spring 31 is attached to the outside of each of the corner wall portions 25*a* to 25*d* of the case main body 27. The lid 28 is fixed to the case main body 27 by latching the rid springs 31 onto an upper face of the lid 28 attached on the top of the case main body 27.

Moreover, stays 32 for allowing the air cleaner 22 to be supported by the body side are attached to the outside of the side wall portion 26*c* on the rear side of the case main body 27, and a protruding flake portion 33F for allowing the air cleaner 22 to be supported by the body side is formed in each of the side wall portions 26*b* and 26*d* on both sides in the vehicle width direction so as to extend and protrude sideways.

Here, in the bottom wall portion 24, the front area thereof is a bottom face portion 35 the entire length of which in the vehicle width direction extends along a horizontal plane, and the rear area thereof is a slanted face portion 36S the entire length of which in the vehicle width direction extends from the rear end edge of the bottom face portion 35 while slanting so that a more rear portion is positioned at a higher level.

Moreover, a drain port 37 penetrating downwards the bottom face portion 35 is formed at the center of the bottom face portion 35 in the vehicle width direction. A drain tube 38 is attached to the outside of this drain port 37.

An exhaust-use attachment hole 40 is formed in a left area (one side in the vehicle width direction) of an upper portion of the side wall portion 26*a* disposed on the front side, that is, on the engine 13 side of the case main body 27. The air cleaner 22 includes an air cleaner exhaust duct 42 of a circular tube which is inserted through the exhaust-use attachment hole 40 along the front and rear direction and attached to the exhaust-use attachment hole 40 in an attachment portion 41 on its outer periphery; a cylindrical air cleaner element 44 attached to an end of this air cleaner exhaust duct 42 inside the air cleaner case 29; and a bracket 45B attached to the side wall 26*c* on the rear side of the case main body 27 to support the air cleaner element 44.

Here, part of this air cleaner exhaust duct 42 outside the air cleaner case 29 is connected with fuel supply equipment 46F shown in FIG. 1, which is an air-intake side of the engine 13 and includes a carburetor or electronic fuel injection system. Note that the air cleaner element 44 in a state of being supported by the air cleaner case 29 is disposed in an upper portion inside the air cleaner case 29 while taking a position which allows the axis line of the air cleaner element 44 to extend along the front and rear direction.

A blowby gas-use attachment hole 47A is formed in an upper portion of the side wall portion 26*d* on the left side of the case main body 27. The air cleaner 22 includes a blowby gas pipe 49 which is inserted through this blowby gas-use attachment hole 47A and attached thereto in an attachment portion 48A on its outer periphery. This blowby gas pipe 49 is for allowing a gas discharged from the engine 13 back into the air cleaner 22 in order to burn the gas, and an end of the blowby gas pipe 49 is pressed against the air cleaner element 44.

A secondary air supply-use attachment hole 51H is formed in an upper portion in a left area of the side wall portion 26*a* on the front side of the case main body 27. The air cleaner 22 includes a secondary air supply pipe 54 which is inserted through this secondary air supply-use attachment hole 51H, attached thereto in an attachment portion 52A on its outer periphery, and further attached to an attachment portion 53A on the air cleaner exhaust duct 42. This secondary air supply pipe 54 is for supplying the air from the air cleaner case 29 to an exhaust side of the engine 13, and a sub-filter 55 is attached to an end of the secondary air supply pipe 54 inside the air cleaner case 29.

Furthermore, in this embodiment, an air intake-use attachment hole 57 is formed in a right area (the other side in the vehicle width direction) of a central portion, in the up and down direction, of the side wall portion 26*a* disposed on the front side, that is, on the engine 13 side of the case main body 27. The air cleaner 22 includes an air cleaner intake-air duct 59 of a circular tube which is inserted into the air cleaner case 29 through this air intake-use attachment hole 57 obliquely from above and from the outside front of the air cleaner case 29, and attached to the air intake-use attachment hole 57 in an attachment portion 58 on its outer periphery. Here, the position of the air intake-use attachment hole 57 is off the position of the aforementioned exhaust-use attachment hole 40, below and to the side. In addition, as shown in FIG. 1, an upper end of the air cleaner intake-air duct 59 is connected with an external duct 60, and this external duct 60 opens under the seat 19 so as to be able to take air in.

In a state of being attached to the air cleaner case 29, part of the air cleaner intake-air duct 59 outside the air cleaner case 29 is a linear tube portion 62 which is linear, inclined in the front and rear direction so that a more front portion is positioned at a higher level but not inclined in the vehicle width direction; and part of the air cleaner intake-air duct 59 inside the air cleaner case 29 is a curved tube portion 65 which is, while being inclined in the front and rear direction so that a more rear portion is positioned at a lower level, curved in the vehicle width direction so as to be positioned, inside the air cleaner case 29, at the opposite side to, that is, at the left side of the air intake-use attachment hole 57 formed in the right area, and is extended up to directly underneath the air cleaner element 44. Here, an attachment portion 63 on an end of the air cleaner intake-air duct 59 inside the air cleaner case 29 is attached to a supporting portion 64 provided in a standing manner on the bottom wall portion 24 of the air cleaner case 29.

Thus, an opening portion 66 which is on the end of the air cleaner intake-air duct 59 inside the air cleaner case 29 and opens toward the inside of the air cleaner case 29, is disposed at the opposite side to the air intake-use attachment hole 57 relative to the central axis line of the cylindrical air cleaner element 44 in the vehicle width direction. Moreover, the central axis line of the opening portion 66 of the air cleaner intake-air duct 59 runs along a direction orthogonal to the central axis line of the air cleaner element 44 and is horizontally oriented to the left. That is, the curved tube portion 65 of the air cleaner intake-air duct 59 is curved at 90 degrees. Further, the entire opening portion 66 of the air cleaner intake-air duct 59 is opposed to a side wall face 67 of the side wall portion 26*d* provided at the left side in a standing manner in the up and down direction.

Furthermore, the aforementioned drain port 37 formed at the lowermost position in the bottom wall portion 24 is disposed on the right side of the opening portion 66 of the air cleaner intake-air duct 59. In other words, the drain port 37 is disposed at a position upstream of the opening portion 66 in the direction of an air flow at the opening portion 66. Here, the opening portion 66 of the air cleaner intake-air duct 59 is disposed at a position where the entire opening portion 66 overlaps the slanted face portion 36S of the bottom wall portion 24 in the horizontal direction, not overlapping the bottom face portion 35 of the bottom wall portion 24.

According to the air cleaner 22 of this embodiment described above, since the air cleaner intake-air duct 59 is inserted into the air cleaner case 29 obliquely from above, and then curved inside the air cleaner case 29 and extended up to directly underneath the air cleaner element 44, the tube length of the air cleaner intake-air duct 59 can be made long. Accordingly, it is possible to obtain the air-intake efficiency to bring out optimum engine characteristics in the saddle-riding vehicle 11 in which importance is placed especially on low-to-middle speed torque.

Moreover, since the entire opening portion 66 of the air cleaner intake-air duct 59 is opposed to the side wall face 67 of the air cleaner case 29, the air introduced into the air cleaner case 29 from the opening portion 66 of the air cleaner intake-air duct 59 will be discharged toward the side wall face 67 of the air cleaner case 29 and accordingly will not easily raise water, mud and the like which have been accumulated in the bottom wall portion 24 of the air cleaner case 29. Therefore, it is possible to prevent the adhesion of the water, mud and the like to the air cleaner element 44 due to the raising, to maintain the filtration efficiency of the air cleaner element 44, and thus to reduce the frequency of maintenance of the air cleaner element 44.

Furthermore, since the drain port 37 is disposed at the position upstream of the opening portion 66 in the direction of an air flow at the opening portion 66, it is possible to allow the water, mud and the like to favorably flow toward the drain port 37 by use of a steady back air flow from the air cleaner case 29 without the influence of the turbulence of air discharged from the opening portion 66 of the air cleaner intake-air duct 59 when the air hits the air cleaner case 29. Therefore, since the water, mud and the like in the bottom wall portion 24 can be favorably discharged from the drain port 37, it is possible to prevent the water, mud and the like from adhering to the air cleaner element 44 and thus to maintain the filtration efficiency of the air cleaner element 44. As a result, it is possible to reduce the frequency of maintenance of the air cleaner element 44.

Next, a description will be given below of a heat insulator attaching structure for a vehicle exhaust pipe according to an embodiment of the present invention with reference to FIGS. 4-9.

FIG. 4 again provides a perspective view showing the vehicle shown in FIG. 1. More specifically, a saddle-riding vehicle (so-called buggy) 11 that is intended mainly for driving over rough terrain, to which the heat insulator attaching structure for a vehicle exhaust pipe according to this embodiment is applied.

Figure 4:
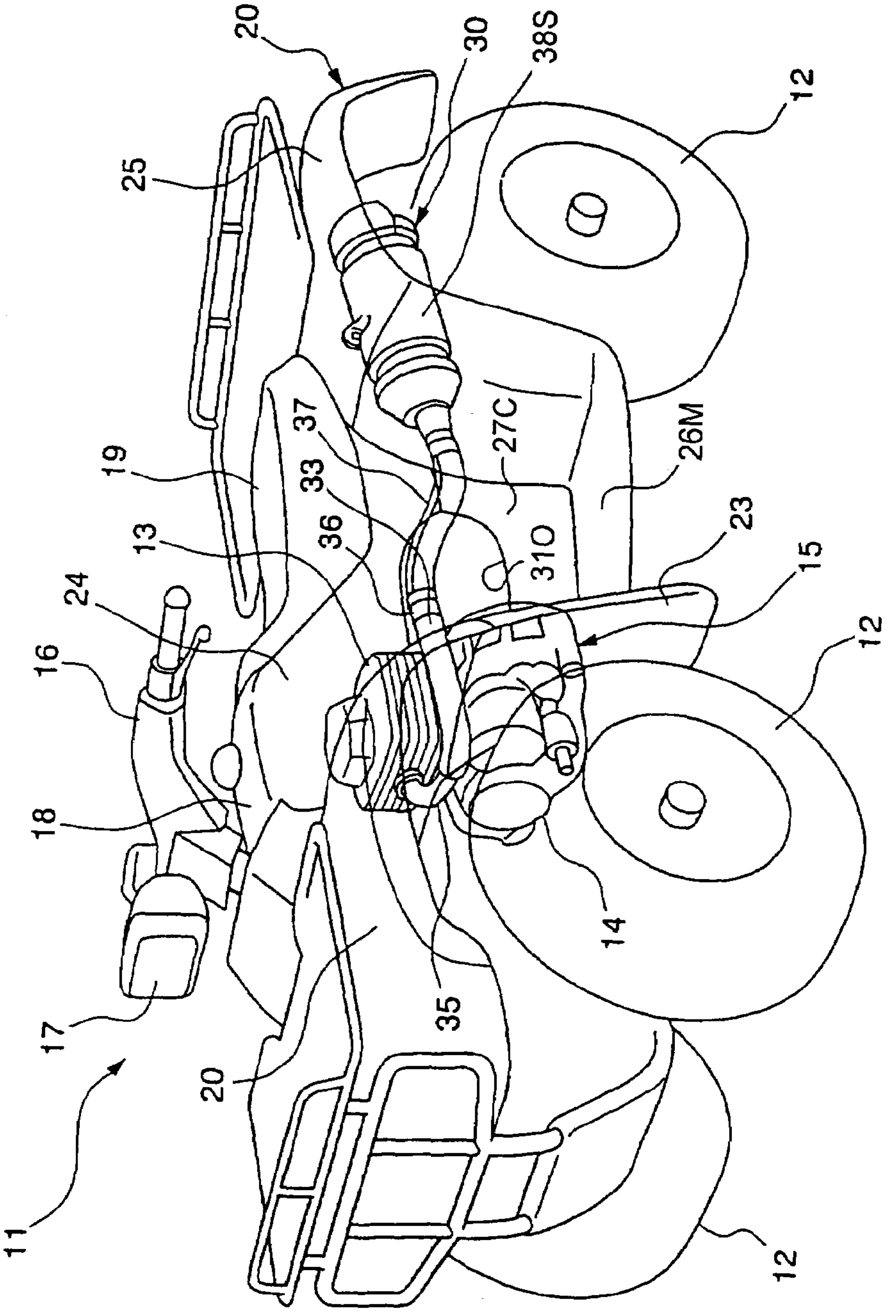

As previously shown in FIG. 1, FIG. 4 also shows saddle-riding vehicle 11 including wheels 12 arranged at four right-front, left-front, right-rear, and left-rear corners of a body; a power unit 15 including an engine 13 mounted at a substantially central position of the body and a transmission 14; a handlebar 16 which is installed on an upper front portion of the body so as to extend in the left and right direction and to which an input to control the front wheels is provided; a head light unit 17 supported by the handlebar 16; a fuel tank 18 installed at the rear of the handlebar 16; a seat 19 installed at the rear of the fuel tank 18; and a body cover 20 constituting an outer shell of the body. Note that this saddle-riding vehicle 11 is assumed to be of a so-called longitudinal layout type in which a crankshaft (not shown) of the engine 13 is provided so as to extend in the front and rear direction.

The body cover 20 includes a front cover 22 which covers a front portion of the body including the front wheels 12; right and left sub-fenders 23 which are provided at the rear of the front cover 22 and cover rear portions of the front wheels 12; a center cover 24 which is disposed at the rear of the front cover 22 and covers from the fuel tank 18 up to right and left side portions of the body; a rear cover 25 which is disposed at the rear of the center cover 24 and covers a rear portion of the body; right and left mud guards 26M which are provided at the rear of the sub fenders 23 and cover respective side portions of the body; and right and left engine sub-covers 27C which are provided between a rear end of the center cover 24 and the respective mud guards 26M and cover the respective side portions of the body.

Figure 5:
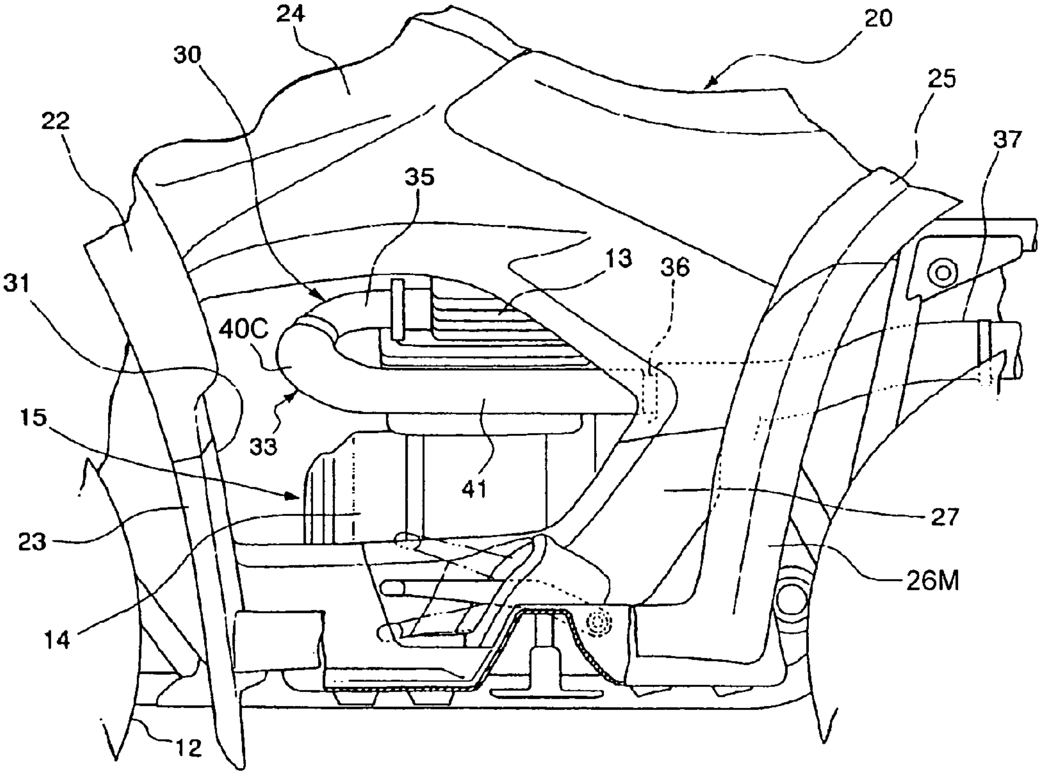
FIG. 5 is a partly enlarged perspective view showing the saddle-riding vehicle to which the heat insulator attaching structure for a vehicle exhaust pipe according to the embodiment of the present invention is applied.

In a front portion of the engine 13, provided is an exhaust duct 30 which is, while being curved, extended sideways, more specifically, leftward in the vehicle width direction, and then extended rearward along a side portion, more specifically, a left portion of the engine 13 in the vehicle width direction. As shown in FIG. 5, this exhaust duct 30 is extended rearward, passing through a gap between the side portion, more specifically, the left portion of the engine 13 in the vehicle width direction and a side portion, more specifically, a left portion of the body cover 20 (more detailedly, a left portion of the center cover 24 and the left mud guard 26M in the vehicle width direction.

Here, an opening portion 310 for exposing the power unit 15 to a side is formed in the side portion of the body cover 20. This opening portion 31 is formed by being surrounded with rear portions of the front cover 22 and sub-fender 23, a lower portion of the center cover 24, and an upper portion of the engine sub-cover 27C.

A heat insulator 33 is attached to a front portion, exposed from this opening portion 31, of the exhaust duct 30. The heat insulator attaching structure according to this embodiment is applied to this attachment.

Figure 6:
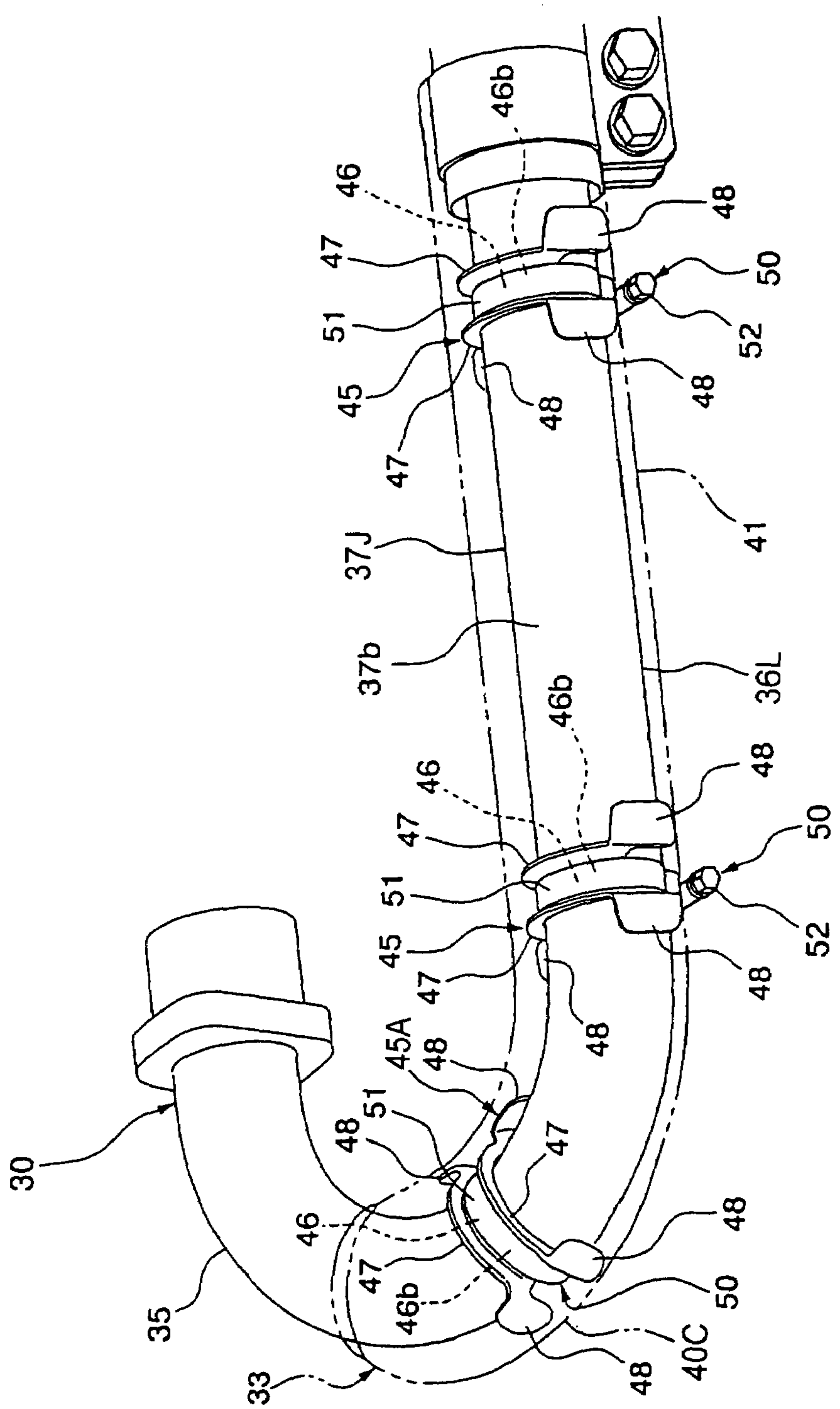
FIG. 6 is a perspective view showing the heat insulator attaching structure for a vehicle exhaust pipe according to the embodiment of the present invention.

As shown in FIG. 6, the portion of the exhaust duct 30 to which the heat insulator 33 is attached is a substantially J-shaped exhaust pipe 37J including a curved circular pipe portion 35 which is extended sideways, more specifically, leftward in the width direction from the engine 13 while being curved to form a semicircular shape as a whole, and a linear circular pipe portion 36L which is linearly extended from an extended end side of the curved circular pipe 35 toward the rear along the side portion, more specifically, the left portion of the engine 13 in the width direction. The heat insulator 33 covers from an outward side up to an upper side of this exhaust pipe 37J in the vehicle width direction. Note that the exhaust duct 30 is configured in such a manner that a silencer 38S shown in FIG. 4 is connected to the exhaust pipe 37J so as to extend rearward therefrom.

Figure 7A:
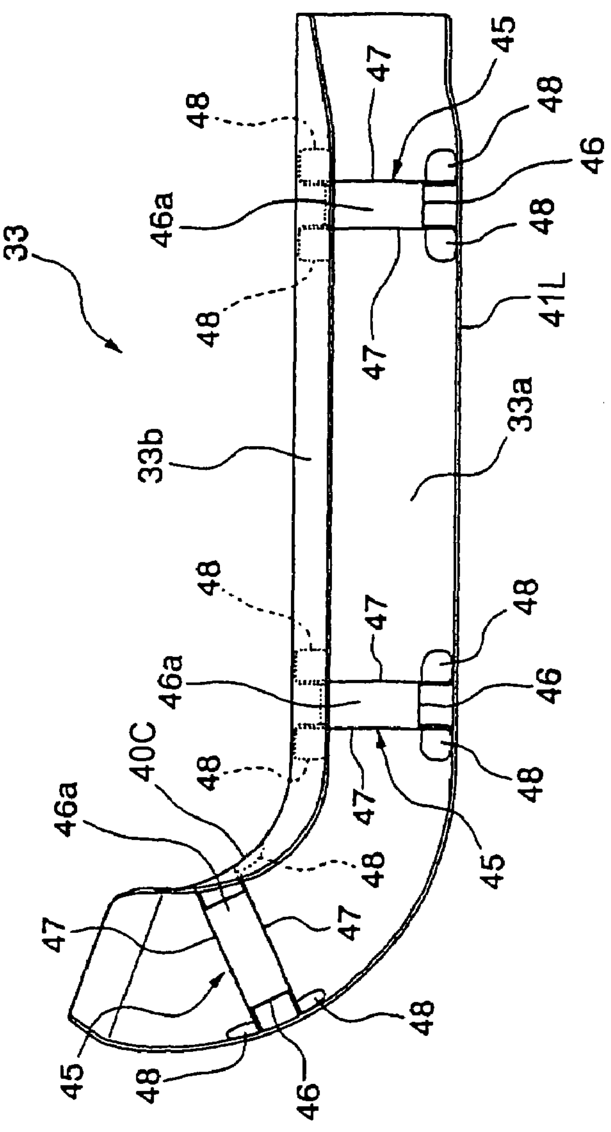
FIGS. 7(*a*) and (*b*) show a state in which attachment members are attached to a heat insulator used in the heat insulator attaching structure for a vehicle exhaust pipe according to the embodiment of the present invention, where FIG. 7(*a*) is a plan view and FIG. 7(*b*) is a left side view of FIG. 7(*a*)
Figure 7B:
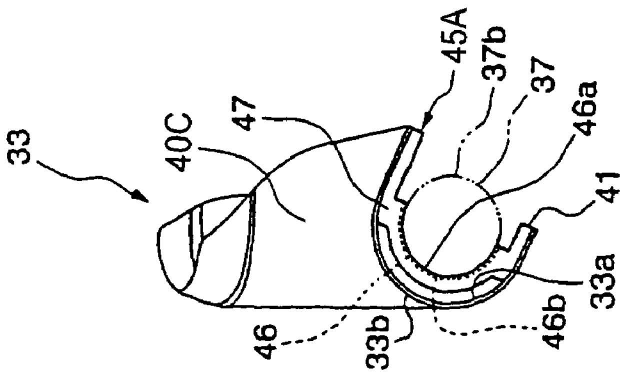

In order to cover the substantially J-shaped exhaust pipe 37J as described above, the heat insulator 33 as a whole has a substantially J shape including a curved portion 40C which is extended while being curved into an arc shape and a linear portion 41L which is continued from an end of the curved portion 40C and linearly extended. This heat insulator 33 has a cross-section orthogonal to its extending direction, curved substantially into an arc shape. As shown in FIGS. 7(*a*) and 7(*b*), a plurality of attachment members 45, more specifically, three attachment members 45 are attached to an inner-peripheral face 33*a* that is a center side of this curve.

Figure 8C:
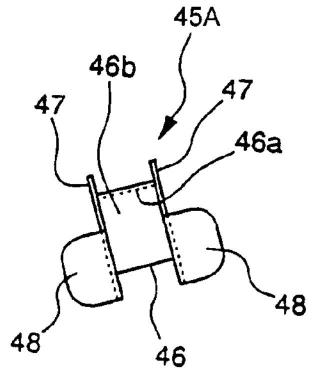
FIGS. 8(*a*)-(*c*) show the attachment member used in the heat insulator attaching structure for a vehicle exhaust pipe according to the embodiment of the present invention, where FIG. 8(*a*) is a plan view, FIG. 8(*b*) is a bottom view of FIG. 8(*a*), and FIG. 8(*c*) is a left side view of FIG. 8(*a*)
Figure 8A:
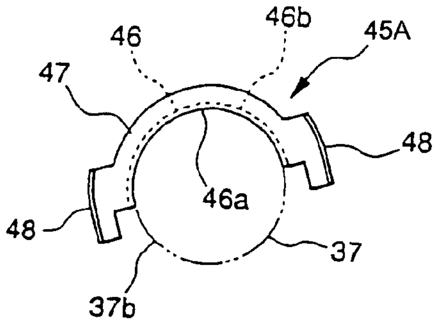
Figure 8B:
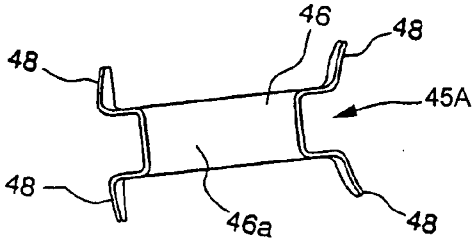

The attachment member 45 is integrally formed in such a manner that a metal plate member is stamped out and bent by a press. As shown in FIGS. 8(*a*) to 8(*c*), the attachment member 45 includes an arc-shaped contact plate portion (arc-shaped contact portion) 46 which has a constant width and is curved into an arc shape having a diameter substantially equal to the diameter of the exhaust pipe 37J; blocking edge plate portions (blocking edge portions) 47 which are raised from curved both-end edge portions that are both ends of this arc-shaped contact plate portion 46 in its width direction (in a direction along a central axis line of the curve), on an outer-peripheral face 46*b* side that is an outer side of the curve in its radius direction, each with an approximately constant height, and over the whole length of the arc-shaped contact plate portion 46 in its circumferential direction; and flange-like attachment plate portions (attachment portions) 48 which are, on both ends of both the blocking edge plate portions 47, each having an arc shape by being raised as described above, in their circumferential direction, bent from the opposite side to the arc-shaped contact portion 46 (outer side of the curve in its radius direction) so as to extend along the width direction of the arc-shaped contact plate portion 46 and protrude outward relative to the arc-shaped contact plate portion 46.

The attachment member 45 as a whole has a semicircular shape by being formed into the above-described shape. The attachment plate portions 48 are formed on the outward side of the curved arc-shaped contact plate portion 46 in its radius direction so as to allow distance therebetween. As shown in FIGS. 6 and 7(*a*) and (*b*), the attachment plate portions 48 of a plurality of, more specifically, three of the attachment members 45 in such a shape are attached to given positions in the inner-peripheral face 33*a* of the heat insulator 33 by welding. To be more specific, the attachment members 45 are attached to a position on the opposite side to the curved portion 40C in the linear portion 41L of the heat insulator 33, to a position on the curved portion 40C side in the linear portion 41L, and to a position in the curved portion 40C.

At this time, all the attachment members 45 are attached, as a whole, along a direction orthogonal to the extending direction of the heat insulator 33, and placed so that the arc-shaped contact plate portions 46 are substantially coaxial with the heat insulator 33 in the cross-section orthogonal to the extending direction of the heat insulator 33. Moreover, all the attachment members 45 are equal to or smaller than the heat insulator 33 in the circumferential length of the cross-section orthogonal to the extending direction of the heat insulator 33. The attachment members 45 are attached so as not to protrude outward in the circumferential direction from the heat insulator 33, in an attached state. That is, the attachment members 45 are invisible from an outer-peripheral face 33*b* side that is the outer side of the heat insulator 33 in its radius direction. Further, in the attached state, inner-peripheral faces 46*a* that are the center side of the curve of the arc-shaped contact plate portions 46 of all the attachment members 45, are capable of coming into contact with given positions in an outer-peripheral face 37*b* on the outer side of the exhaust pipe 37J in its radius direction. Here, the attachment plate portions 48 are appropriately curved in accordance with the shapes of the attachment positions in the inner-peripheral face 33*a* so that the entire face of each attachment plate portion 48 comes into contact with the inner-peripheral face 33*a* of the heat insulator 33.

Figure 9:
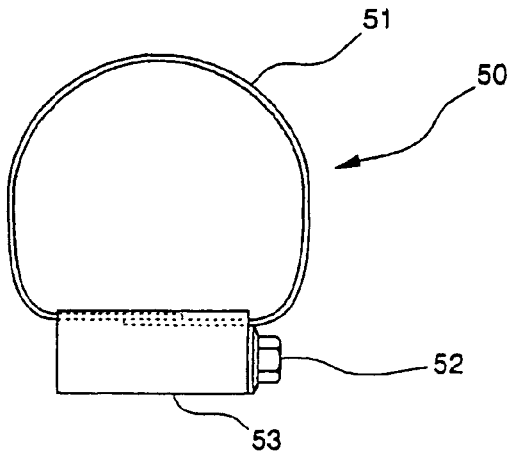
FIG. 9 is a side view showing a band member used in the heat insulator attaching structure for a vehicle exhaust pipe according to the embodiment of the present invention.

Thereafter, the heat insulator 33 in which a plurality of, more specifically, three of the attachment members 45 have been attached to the inner-peripheral face 33*a* as described above, is brought into contact with the outer-peripheral face 37*b* of the exhaust pipe 37J through the inner-peripheral faces 46*a* of the arc-shaped contact plate portions 46 of all the attachment members 45. At the same time, as shown in FIG. 9, band members 50 are individually put around the outer-peripheral faces 46*b* of all the arc-shaped contact plate portions 46 and the outer-peripheral face 37*b* of the exhaust pipe 37J. The attachment members 45 are fastened to the exhaust pipe 37J with these band members 50.

Here, as shown in FIG. 9, the band member 50 includes a belt body 51 and an engagement part 53 which is fixed to a base end of this belt body 51, can engage with a tip end of the belt body 51, and can change an engagement position in the belt body 51 along the lengthwise direction of the belt body 51 by turning an adjusting part 52 made of a bolt. The belt body 51 is formed into a ring shape, the tip end thereof is engaged with the engagement part 53, and then the size of the ring is changed by adjusting the adjusting part 52.

For example, before the heat insulator 33 with the attachment members 45 attached thereto is brought into contact with the exhaust pipe 37J, the band member 50 as described above, in a state where the belt body 51 is curved in advance but the tip end thereof is not engaged with the engagement part 53, is passed through between the attachment plate portions 48 on one side of each attachment member 45 in its circumferential direction, passed along the outer-peripheral side of the arc-shaped contact plate portion 46 of each attachment member 45, and led out from between the attachment members 45 on the opposite side in the circumferential direction. In this state, the inner-peripheral faces 46*a* of the arc-shaped contact plate portions 46 of the attachment members 45 on the heat insulator 33 are brought into contact with the outer-peripheral face 37*b* of the exhaust pipe 37J. At the same time, as for the band members 50 provided on all the arc-shaped contact plate portions 46, the tip ends of the belt bodies 51 are engaged with the respective engagement parts 53 and fastened by use of the respective adjusting parts 52, whereby the heat insulator 33 is fastened to the exhaust pipe 37J through the attachment members 45.

At this time, since the blocking edge plate portions 47 rising on the outer-peripheral face 46*b* side are formed at the curved both-end edge portions of each of the arc-shaped contact plate portions 46, when the adjusting part 52 is adjusted in the fastening process, each band member 50 is guided by the blocking edge plate portions 47 on both sides and brought into contact with the outer-peripheral face 46*b* of the arc-shaped contact plate portion 46. As a result, bothersome positional adjustment of the band members 50 to the arc-shaped contact plate portions 46, and the like become unnecessary.

According to the heat insulator attaching structure for a vehicle exhaust pipe of this embodiment described above, the attachment plate portions 48 of the attachment members 45 are attached to the inner-peripheral face 33*a* of the heat insulator 33 curved into an arc shape; the inner-peripheral faces 46*a* of the arc-shaped contact plate portions 46, which are formed so as to allow distance from the attachment plate portions 48 of the attachment members 45, are brought into contact with the outer-peripheral face 37*b* of the exhaust pipe 37J; the band members 50 are put around the outer-peripheral faces 46*b* of the arc-shaped contact plate portions 46 and the outer-peripheral face 37*b* of the exhaust pipe 37J; and the attachment members 45 are fastened to the exhaust pipe 37J with these band members 50. Accordingly, since the heat insulator 33 is attached to the exhaust pipe 37J through the attachment members 45 attached on the inner-peripheral face 33$a$, that is, the exhaust pipe 37J side of the heat insulator 33 and through the band members 50 put around these attachment members 45, the attachment members 45 and the band members 50 are covered with the heat insulator 33. Thus, it is possible to improve the appearance.

Moreover, the heat insulator 33 is attached to the exhaust pipe 37J through the attachment members 45, thus allowing distance therebetween. Accordingly, since the heat insulator 33 does not come into direct contact with the exhaust pipe 37J, the heat of the exhaust pipe 37J becomes difficult to be transmitted to the heat insulator 33. Thus, it is possible to reduce the influence of the heat (generation of rust and occurrence of distortion) on the heat insulator 33.

Further, since the attachment is achieved by means of the band members 50, the attachment work is facilitated, and at the same time, strict attachment precision becomes unnecessary. Accordingly, the manufacture of each of the exhaust pipe 37J, the attachment members 45 and the heat insulator 33 is facilitated. For the exhaust pipe 37J in particular, which is long in length and subjected to bending and the like, it becomes unnecessary to form an attachment portion for attaching the heat insulator 33, thus significantly facilitating the manufacture thereof.

In addition, since the blocking edge plate portions 47 rising on the outer-peripheral 46$b$ side are formed at the curved both-end edge portions of the arc-shaped contact plate portion 46, the rigidity of the attachment member 45 can be ensured. Accordingly, the heat insulator 33, which is attached to the exhaust pipe 37J through the attachment members 45, is to be surely attached to the exhaust pipe 37J.

Furthermore, the band member 50 is guided by the blocking edge plate portions 47 on both sides thereof, attached to the outer-peripheral face 46$b$ of the arc-shaped contact plate portion 46 and, at the same time, prevented from falling off the arc-shaped contact plate portion 46 by the blocking edge plate portions 47 on the both sides. Accordingly, the band members 50 can be surely attached to the attachment members 45. As a result, it is possible to surely attach the heat insulator 33 to the exhaust duct 30 and to improve the workability of the assembly work.

In addition, the attachment plate portion 48 is formed on the opposite side of the blocking edge plate portion 47 to the arc-shaped contact plate portion 46, whereby the blocking edge plate portion 47 can be shared by portions where the attachment plate portions 48 are formed so as to allow distance from the arc-shaped contact plate portion 46. Thus, it is possible to simplify the shape of the attachment member 45 and to reduce the weight thereof.

Note that this embodiment is not limited to a saddle-riding vehicle but can be applied to other various types of vehicles. This embodiment is particularly preferable for a vehicle such as a motorcycle in which an exhaust pipe is exposed.

EFFECTS OF THE INVENTION

As described in detail above, according to the first aspect of the present invention, since an air cleaner intake-air duct is inserted into an air cleaner case obliquely from above, and then curved inside the air cleaner case and extended up to directly underneath an air cleaner element, the length of the air cleaner intake-air duct can be made long. Therefore, it is possible to obtain the air intake efficiency to bring out optimum engine characteristics in a saddle-type vehicle in which importance is placed especially on low-to-middle speed torque.

According to the second aspect of the present invention, since the entire of an opening portion of the air cleaner intake-air duct is opposed to a side wall face of the air cleaner case, the air introduced into the air cleaner case from the opening portion of the air cleaner intake-air duct will be discharged toward the side wall face of the air cleaner case and accordingly will not easily raise water, mud and the like accumulated in a bottom wall portion of the air cleaner case. Therefore, it is possible to prevent the adhesion of the water, mud and the like to the air cleaner element due to the raising, to maintain the filtration efficiency of the air cleaner element, and thus to reduce the frequency of maintenance thereof.

According to the third aspect of the present invention, since a drain port is disposed at a position upstream of the opening portion in the direction of an air flow at the opening portion of the air cleaner intake-air duct, it is possible to allow the water, mud and the like to favorably flow toward the drain port by use of a steady back air flow from the air cleaner case without the influence of the turbulence of air discharged from the opening portion of the air cleaner intake-air duct when the air hits the air cleaner case. Therefore, since the water, mud and the like accumulated in the bottom wall portion can be favorably discharged from the drain port, it is possible to prevent the water, mud and the like from adhering to the air cleaner element and thus to maintain the filtration efficiency of the air cleaner element. As a result, it is possible to reduce the frequency of maintenance of the air cleaner element.

According to the fourth aspect of the present invention, an attachment member is attached to an inner-peripheral face of a heat insulator curved into an arc shape through an attachment portion; an inner-peripheral face of an arc-shaped contact portion formed so as to allow distance from this attachment portion of the attachment member is brought into contact with an outer-peripheral face of an exhaust pipe; a band member is put around an outer-peripheral face of the arc-shaped contact portion and the outer-peripheral face of the exhaust pipe; and the attachment member is fastened to the exhaust pipe with this band member. Accordingly, since the heat insulator is attached to the exhaust pipe through the attachment member attached to the inner-peripheral face, that is, the exhaust pipe side of the heat insulator and through the band member put around this attachment member, the attachment member and the band member is covered with the heat insulator. Thus, it is possible to improve the appearance. Moreover, the heat insulator is attached to the exhaust pipe through the attachment member, thus allowing distance therebetween. Accordingly, since the heat insulator does not come into direct contact with the exhaust pipe, the heat of the exhaust pipe becomes difficult to be transmitted to the heat insulator. Thus, it is possible to reduce the influence of heat on the heat insulator. Furthermore, since the attachment is achieved by means of the band member, the attachment work is facilitated, and at the same time, strict attachment precision becomes unnecessary. Thus, the manufacture of each of the exhaust pipe, the attachment member and the heat insulator is facilitated. For the exhaust pipe in particular, which is long in length and subjected to bending and the like, an attachment portion becomes unnecessary, thus significantly facilitating the manufacture thereof.

According the fifth aspect of the present invention, since blocking edge portions rising on the outer-peripheral face side are formed at curved both-end edge portions of the arc-shaped contact portion, the rigidity of the attachment member can be ensured. Accordingly, the heat insulator, which is attached to the exhaust pipe through this attachment member, is to be surely attached to the exhaust pipe.

Moreover, guided by the blocking edge portions on both sides, the band member is attached to the outer-peripheral face of the arc-shaped contact portion and, at the same time, prevented from falling off the arc-shaped contact portion by the blocking edge portions on both sides. Accordingly, the band member can be surely attached to the attachment member. As a result, it is possible to surely attach the heat insulator to the exhaust pipe and to improve the workability of assembly work.

According to the sixth aspect of the present invention, by forming the attachment portions on the opposite side of each blocking edge portion to the arc-shaped contact portion, the blocking edge portion can be shared by portions where the attachment portions are formed so as to allow distance from the arc-shaped contact portion. Thus, it is possible to simplify the shape of the attachment member and to reduce the weight thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A heat insulator attaching structure for a vehicle exhaust pipe, comprising:

a heat insulator with a cross-section orthogonal to an extending direction thereof being curved substantially into an arc shape is attached to an exhaust pipe of a vehicle engine so as to allow distance therebetween;

an attachment member attached to an inner-peripheral face of the heat insulator, the attachment member being formed with a single curved arc-shaped contact portion and a pair of attachment portions, the attachment portions being formed on outward sides of the arc-shaped contact portion in a radial direction thereof so as to allow distance therebetween for attaching the attachment member to the inner-peripheral face of the heat insulator, an inner-peripheral face of the arc-shaped contact portion of the attachment member contacting an outer-peripheral face of the exhaust pipe; and a band member fitted around an outer-peripheral face of the arc-shaped contact portion of the attachment member and the outer-peripheral face of the exhaust pipe, thereby fastening the attachment member to the exhaust pipe, wherein the heat insulator, the attachment member, and the band member are separate elements.

2. The heat insulator attaching structure for a vehicle exhaust pipe according to claim 1, wherein blocking edge portions are formed in the attachment member, the blocking edge portions rising on the outer-peripheral face side, at each of two curved edge portions of the arc-shaped contact portion.

3. The heat insulator attaching structure for a vehicle exhaust pipe according to claim 2, wherein the attachment portions are formed in the attachment member, each on an opposite side of each of the blocking edge portions to the arc-shaped contact portion.

4. The heat insulator attaching structure for a vehicle exhaust pipe according to claim 3, wherein the band member fits between the blocking edge portions.

5. The heat insulator attaching structure for a vehicle exhaust pipe according to claim 2, wherein the blocking edge portions extend in a radial direction between the exhaust pipe and the heat insulator, a space being provided between the exhaust pipe and the heat insulator.

6. The heat insulator attaching structure for a vehicle exhaust pipe according to claim 1, wherein the exhaust pipe is substantially J-shaped, and includes a curved portion and a linear section.

7. The heat insulator attaching structure for a vehicle exhaust pipe according to claim 6, the heat insulator further comprising a curved section for fitting at least partially around the curved portion of the exhaust pipe, and a linear section for fitting at least partially around the linear portion of the exhaust pipe.

8. A saddle-riding vehicle with an engine, comprising:

an air cleaner attached to a rear side of the engine having an air cleaner element disposed in an upper portion inside an air cleaner case; and a heat insulator attaching structure for a vehicle exhaust pipe attached to a front of the engine, the heat insulator attaching structure including:

a heat insulator with a cross-section orthogonal to an extending direction thereof being curved substantially into an arc shape is attached to an exhaust pipe of a vehicle engine so as to allow distance therebetween;

an attachment member attached to an inner-peripheral face of the heat insulator, the attachment member being formed with a single curved arc-shaped contact portion and a pair of attachment portions, the attachment portions being formed on outward sides of the arc-shaped contact portion in a radial direction thereof so as to allow distance there between for attaching the attachment member to the inner-peripheral face of the heat insulator, an inner-peripheral face of the arc-shaped contact portion of the attachment member contacting an outer-peripheral face of the exhaust pipe; and a band member fitted around an outer-peripheral face of the arc-shaped contact portion of the attachment member and the outer-peripheral face of the exhaust pipe, thereby fastening the attachment member to the exhaust pipe, wherein the heat insulator, the attachment member, and the band member are separate elements.

9. The saddle-riding vehicle with an engine according to claim 8, wherein blocking edge portions are formed in the attachment member, the blocking edge portions rising on the outer-peripheral face side at each of two curved edge portions of the arc-shaped contact portion.

10. The saddle-riding vehicle with an engine according to claim 9, wherein the attachment portions are formed in the attachment member, each on an opposite side of each of the blocking edge portions to the arc-shaped contact portion.

11. The saddle-riding vehicle with an engine according to claim 10, wherein the band member fits between the blocking edge portions.

12. The saddle-riding vehicle with an engine according to claim 9, wherein the blocking edge portions extend in a radial direction between the exhaust pipe and the heat insulator, a space being provided between the exhaust pipe and the heat insulator.

13. The saddle-riding vehicle with an engine according to claim 8, wherein the exhaust pipe is substantially J-shaped, and includes a curved portion and a linear section.

14. The saddle-riding vehicle with an engine according to claim 13, the heat insulator further comprising a curved section for fitting at least partially around the curved portion of the exhaust pipe, and a linear section for fitting at least partially around the linear portion of the exhaust pipe.

15. The saddle-riding vehicle with an engine according to claim 8, further comprising:

an air cleaner element disposed in an upper portion inside an air cleaner case; and an air cleaner intake-air duct inserted into the air cleaner case obliquely from above, wherein the air cleaner intake-air duct curves inside the air cleaner case and extends to a position directly underneath the air cleaner element.

16. The saddle-riding vehicle with an engine according to claim 15, wherein substantially an entire opening portion of the air cleaner intake-air duct inside the air cleaner case is opposed to a side wall face of the air cleaner case.

17. The saddle-riding vehicle with an engine according to claim 16, wherein a drain port is provided in a bottom wall portion of the air cleaner case, at a position upstream of the opening portion in a direction of an air flow at the opening portion of the air cleaner intake-air duct inside the air cleaner case.

18. The saddle-riding vehicle with an engine according to claim 16, further comprising an attachment device on an end of the air cleaner intake-air duct inside the air cleaner case which is attached to a supporting portion provided in a standing manner on the bottom wall portion of the air cleaner case.

19. The heat insulator attaching structure for a vehicle exhaust pipe according to claim 1, wherein the arc-shaped contact portion of the attachment member is substantially semicircular in shape and also makes contacts with substantially half of the outer-peripheral face of the exhaust pipe.

20. The saddle-riding vehicle with an engine according to claim 8, wherein the arc-shaped contact portion of the attachment member is substantially semicircular in shape and also makes contacts with substantially half of the outer-peripheral face of the exhaust pipe.

21. The heat insulator attaching structure for a vehicle exhaust pipe according to claim 1, wherein the attachment portions are appropriately curved in accordance with shapes of attachment positions in the inner-peripheral face of the heat insulator, so that an entire face of each of the attachment portions comes into contact with the inner-peripheral face of the heat insulator.

22. The saddle-riding vehicle with an engine according to claim 8, wherein the attachment portions are appropriately curved in accordance with shapes of attachment positions in the inner-peripheral face of the heat insulator, so that an entire face of each of the attachment portions comes into contact with the inner-peripheral face of the heat insulator.

* * * * *